US011945546B2

(12) United States Patent
Mejia Cobo

(10) Patent No.: US 11,945,546 B2
(45) Date of Patent: Apr. 2, 2024

(54) BICYCLE DRIVETRAIN

(71) Applicant: Marcelo Alonso Mejia Cobo, Redmond, WA (US)

(72) Inventor: Marcelo Alonso Mejia Cobo, Redmond, WA (US)

(*) Notice: Subject to any disclaimer, the term of this patent is extended or adjusted under 35 U.S.C. 154(b) by 81 days.

(21) Appl. No.: 17/694,983

(22) Filed: Mar. 15, 2022

(65) Prior Publication Data
US 2023/0294792 A1    Sep. 21, 2023

(51) Int. Cl.
*B62M 9/06* (2006.01)
*B62M 9/16* (2006.01)
*F16H 9/24* (2006.01)

(52) U.S. Cl.
CPC ............. *B62M 9/06* (2013.01); *B62M 9/16* (2013.01); *F16H 9/24* (2013.01)

(58) Field of Classification Search
CPC .............. B62M 9/06; B62M 9/16; F16H 9/24
USPC ............................................... 474/69
See application file for complete search history.

(56) References Cited

U.S. PATENT DOCUMENTS

| 3,661,024 A | 5/1972 | Cooke |
| 4,457,739 A * | 7/1984 | Iseman ............... F16H 55/54 474/69 |

FOREIGN PATENT DOCUMENTS

| CZ | 201900491 | 5/2021 | |
| DE | 19532861 | 3/1997 | |
| DE | 102004039874 A1 * | 2/2006 | ............. B62M 9/06 |
| FR | 2797670 A1 * | 2/2001 | ............. B62M 9/08 |

OTHER PUBLICATIONS

International Search Report and Written Opinion for PCT/US2023/015219, dated Jun. 16, 2023, 13 pages.

* cited by examiner

*Primary Examiner* — Gene O Crawford
*Assistant Examiner* — Emily R Kincaid
(74) *Attorney, Agent, or Firm* — Ray Quinney & Nebeker P.C.; John O. Carpenter

(57) ABSTRACT

A pedal drivetrain includes an input interface, an output interface, and a power transmission belt. The power transmission belt is engaged with the input interface and output interface to transmit force from the input interface to the output interface. At least one of the input interface and the output interface includes a plurality of movable pins engaged with the power transmission belt.

20 Claims, 11 Drawing Sheets

FIG. 9
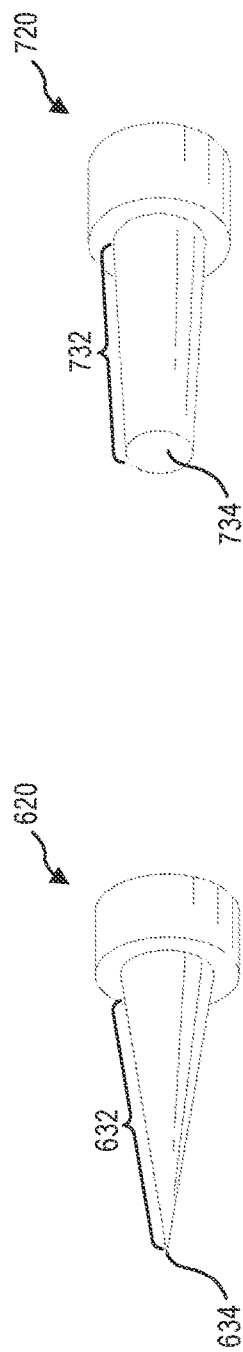
FIG. 10
FIG. 11
FIG. 12
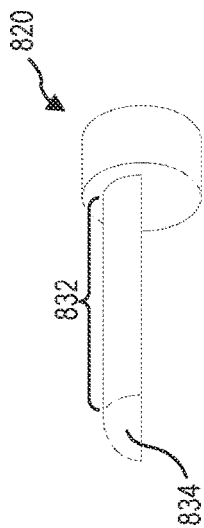
FIG. 13
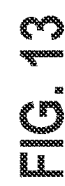

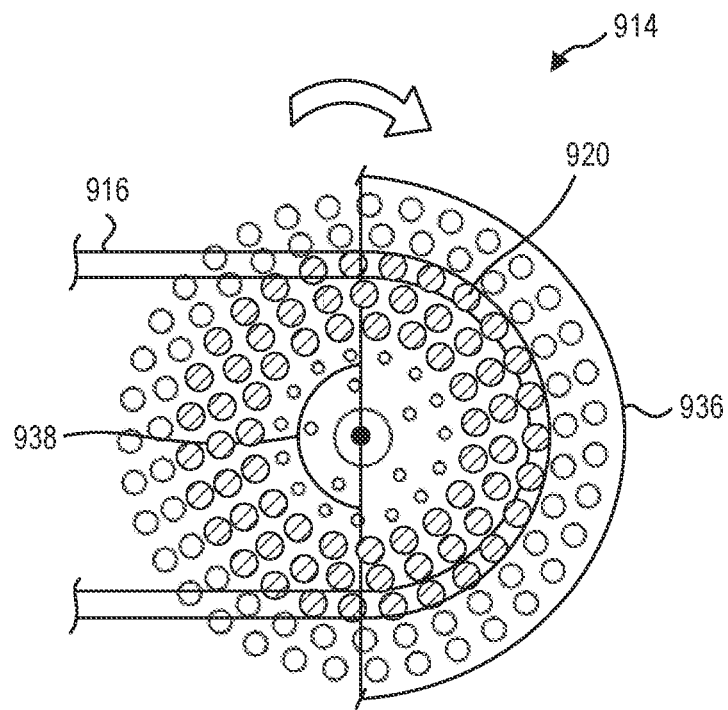
FIG. 14
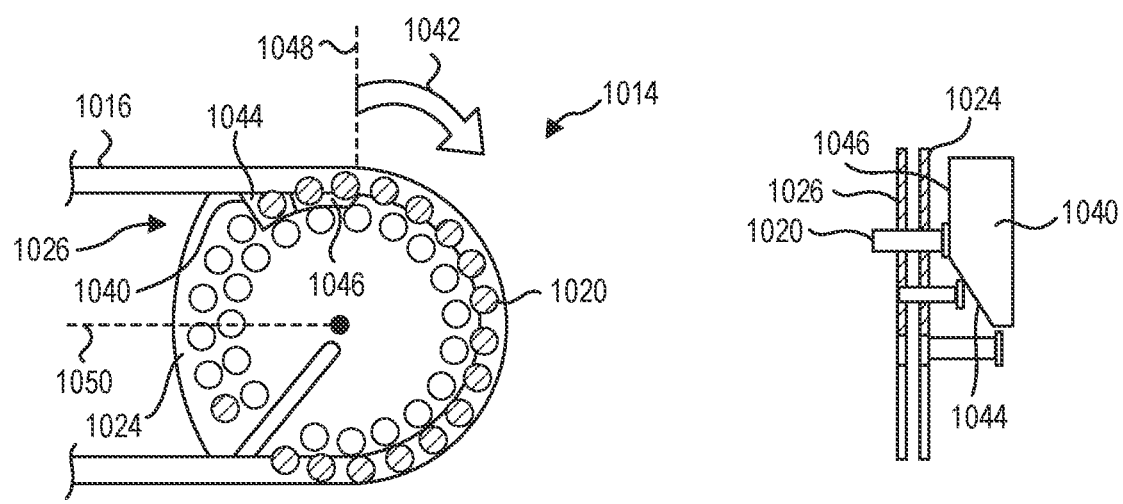
FIG. 15-1
FIG. 15-2

BICYCLE DRIVETRAIN

BACKGROUND

Background and Relevant Art

Bicycles provide motive power driven by a rider's legs. A human rider is limited in how much force they are able to generate through the pedals and crankset of the bicycle, and, hence, many bicycles provide drivetrains with variable gearing ratios for different terrain and surface conditions.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

In some embodiments, a pedal drivetrain includes an input interface, an output interface, and a power transmission belt. The power transmission belt is engaged with the input interface and output interface to transmit force from the input interface to the output interface. At least one of the input interface and the output interface includes a plurality of movable pins engaged with the power transmission belt.

In some embodiments, a pedal drivetrain includes an input interface, an output interface, and a power transmission belt. The power transmission belt is engaged with the input interface and output interface to transmit force from the input interface to the output interface. The input interface and the output interface include a plurality of movable pins engaged with the power transmission belt and the plurality of movable pins is positioned in a plurality of concentric rings around a rotational axis.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 9 is a perspective view of a pin, according to at least one embodiment of the present disclosure;

FIG. 10 is a perspective view of a tapered pin, according to at least one embodiment of the present disclosure;

FIG. 11 is a perspective view of a conical pin, according to at least one embodiment of the present disclosure;

FIG. 12 is a perspective view of a frustoconical pin, according to at least one embodiment of the present disclosure;

FIG. 13 is a perspective view of a semicylindrical pin, according to at least one embodiment of the present disclosure;

FIG. 14 is a side view of an input shaft interface illustrating the rotational timing of actuation, according to at least one embodiment of the present disclosure;

FIG. 15-1 is a side view of an input shaft interface illustrating a ramped actuation mechanism, according to at least one embodiment of the present disclosure;

FIG. 15-2 is a radial view of the input shaft interface of FIG. 15-1, according to at least one embodiment of the present disclosure;

FIG. 19-1 is a side view of the chain belt of FIG. 18, according to at least one embodiment of the present disclosure;

FIG. 19-2 is an end view of the chain belt of FIG. 19-1, according to at least one embodiment of the present disclosure;

FIG. 21-1 is a side view of a high-resolution input interface with a first engagement profile, according to at least one embodiment of the present disclosure;

FIG. 21-2 is a side view of the high-resolution input interface of FIG. 21-1 with a second engagement profile, according to at least one embodiment of the present disclosure; and FIG. 21-3 is a side view of the high-resolution input interface of FIG. 21-1 with a third engagement profile, according to at least one embodiment of the present disclosure.

DETAILED DESCRIPTION

This disclosure generally relates to drivetrains including a chain or cable for power transmission from an input shaft to an output shaft. More particularly, this disclosure relates to bicycle drivetrains that are primarily or exclusively pedal-driven and/or human-powered, but drivetrains systems according to the present disclosure may be applicable to electric or convention internal combustion engine (ICE) drivetrains in a variety of vehicles or devices.

Figure 1:
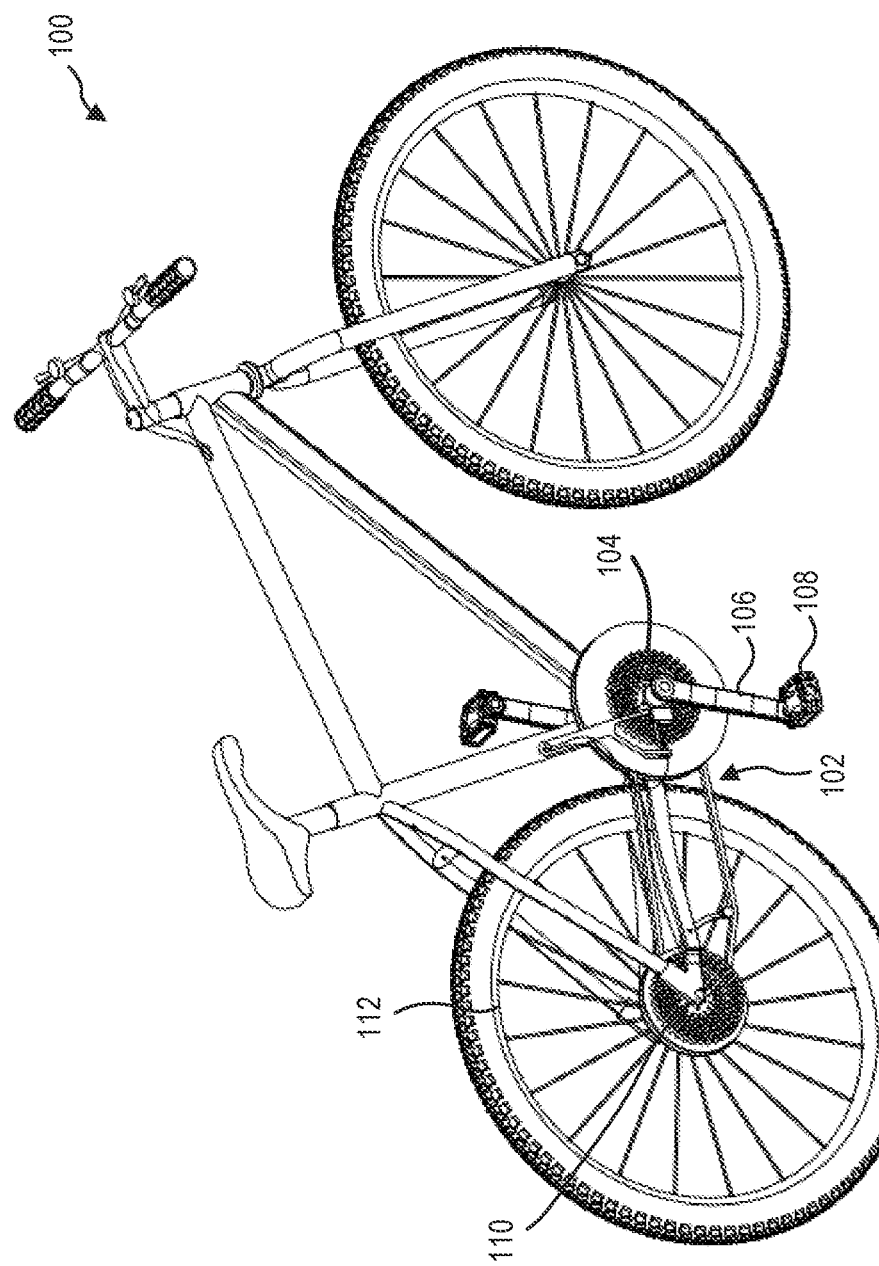
FIG. 1 is a perspective view of a bicycle with a gearless drivetrain, according to at least one embodiment of the present disclosure.
Figure 2:
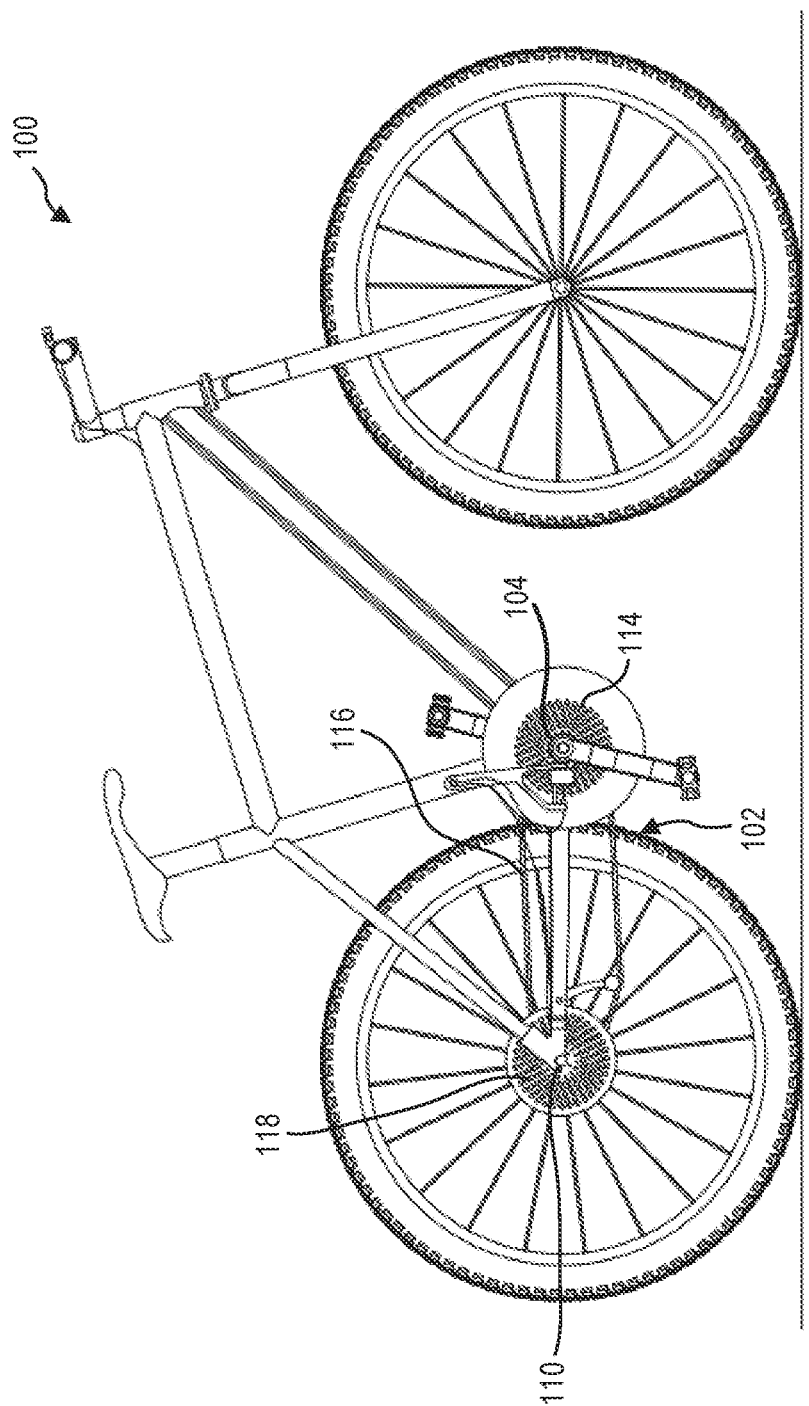
FIG. 2 is a side view of the bicycle of FIG. 1 with a gearless drivetrain, according to at least one embodiment of the present disclosure.

FIG. 1 is a perspective view of a bicycle 100. The bicycle 100 includes a drivetrain 102 that converts an input torque around an input shaft 104 connected to the crankarms 106 and pedals 108 to an output torque around an output shaft 110 connected to the rear wheel 112. FIG. 2 is a side view of the bicycle 100 of FIG. 1. The drivetrain 102 includes an input interface 114 that connects the input shaft 104 to a belt 116, which is, in turn, connected to an output interface 118 connected to the output shaft 110.

Figure 3:
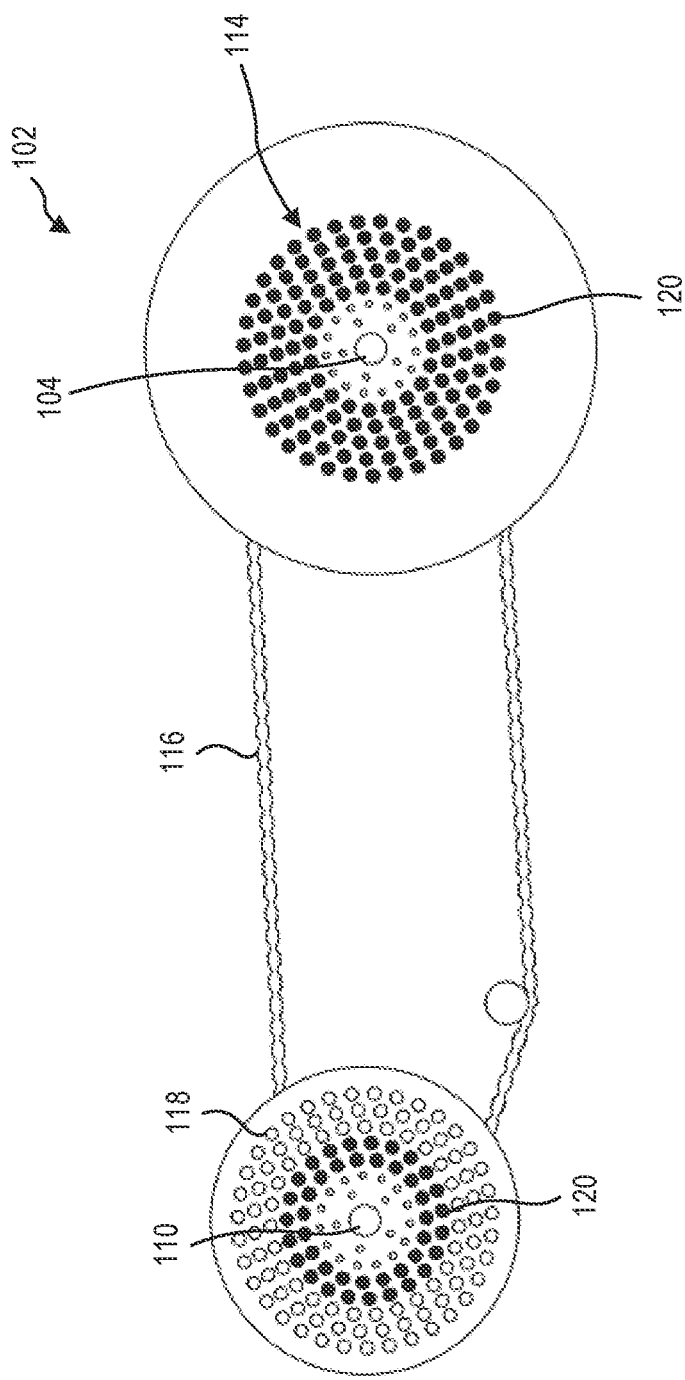
FIG. 3 is a detail view of a gearless drivetrain in a first ratio, according to at least one embodiment of the present disclosure.

In some embodiments, a drivetrain according to the present disclosure transmits power from an input shaft to an output shaft through a variable ratio. Referring now to FIG. 3, a drivetrain 102, according to some embodiments of the present disclosure includes an input shaft 104 and output shaft 110 that are connected by a belt 116. The belt 116 transmits a torque applied to the input shaft 104 through the belt 116 to apply a torque to the output shaft 110. In some embodiments, the input shaft 104 is a crankset, such as on a bicycle or other pedal-driven device. In some embodiments, the input shaft 104 is a crankshaft, such as on a motorcycle or other motor-driven device. In some embodiments, the output shaft 110 is a drive axle, such as on a bicycle or other wheeled vehicle. In some embodiments, the output shaft 110 is another drive shaft, such as on a propeller or other rotational device. In some embodiments, the output shaft 110 of the drivetrain 102 is an input shaft for another system or device. The drivetrain 102 allows for variable ratios to provide a mechanical advantage or conversion between the input torque and input velocity at the input shaft 104 and the output torque and output velocity at the output shaft 110.

FIG. 3 illustrates the drivetrain 102 in a high ratio between an input interface and an output interface. The drive ratio is determined by the ratio of an input radius of the input interface 114 relative to an output radius of the output interface 118. In some embodiments, the input interface 114 or output interface 118 is a fixed radius, such as a single gear. In some embodiments, the input interface 114 or output interface 118 includes a conventional derailleur while the other interface include a plurality of pins to provide a variable radius, as described herein. In the illustrated embodiment of FIG. 3, both the input interface 114 and output interface 118 are variable radius interfaces that use concentric rings of pins 120. The darkened pins in the illustrated embodiment indicate actuated pins that are engaged between a first support and a second support to interact with the belt 116.

In some embodiments, each ring of the concentric rings of the interface may be actuatable independently of the other rings. In some embodiments, the interface actuates all pins 120 within (i.e., closer to the axis of the interface) the outermost actuated ring. For example, the outermost ring of the input interface 114 is actuated in FIG. 3, and therefore, all rings, and all pins 120, of the input interface 114 are actuated. The output interface 118 has the second ring (in the radially outward direction from the axis) as the outermost actuated ring, so the pins 120 of the second ring and the first ring are actuated while the rings outside of the second ring (third, fourth, fifth rings) are not actuated.

The pins 120 may be actuated through one or more of actuation mechanisms, either directly or indirectly. In some embodiments, the pins 120 are individually actuatable. In some embodiments, the pins 120 are actuatable in batches of two or more, such as actuating an entire ring simultaneously or substantially simultaneously. Substantially simultaneously should be understood as actuating an entire ring within a single revolution of the ring around the axis.

Figure 4:
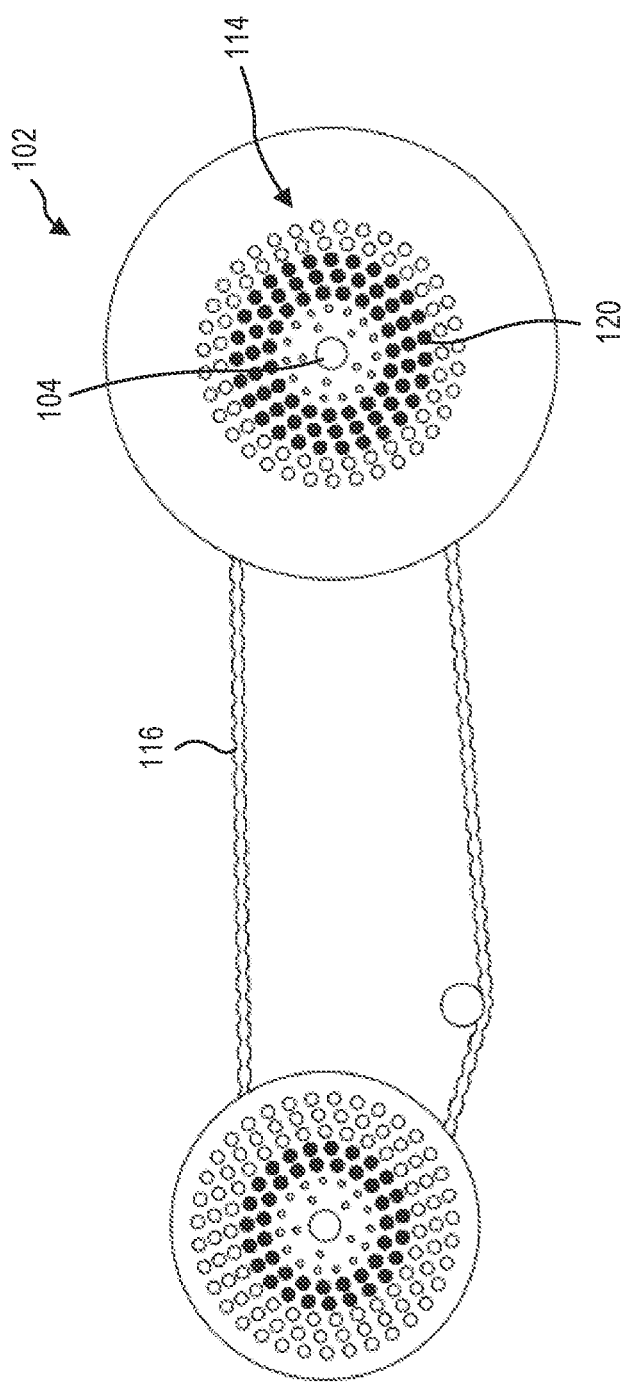
FIG. 4 is a detail view of the gearless drivetrain of FIG. 3 in a second ratio, according to at least one embodiment of the present disclosure.

FIG. 4 illustrates the drivetrain 102 of FIG. 3 with the input radius reduced. In some embodiments, a drivetrain 102 according to the present disclosure includes a variable radius input interface 114 between the input shaft 104 and the belt 116. By changing the input radius between the input shaft 104 and the belt 116, the linear velocity of the belt 116 and the force applied to the belt 116 change. The variable radius input interface 114 can change radius in discrete steps by actuating a plurality of pins 120 in concentric rings around the input shaft 104. The concentric rings may be positioned at equal radial intervals, while the pins 120 of each ring are positioned at equal rotational spacing. In other words, the spacing between each pin 120 remains the same as the radius of the input interface 114 changes by actuating the pins 120 or rings of pins 120.

In various embodiments, the pins 120 are actuated by one or more mechanical, electromechanical, magnetic, hydraulic, or pneumatic actuators, or combinations thereof. By actuating the pins 120 in an axial direction of the input shaft 104, transverse to both the tension of the belt 116 and the radial direction of the input shaft 104, the pins 120 can transmit force between the input interface 114 and the belt 116 without the actuator mechanism bearing the force between transmitted therebetween.

Figure 5:
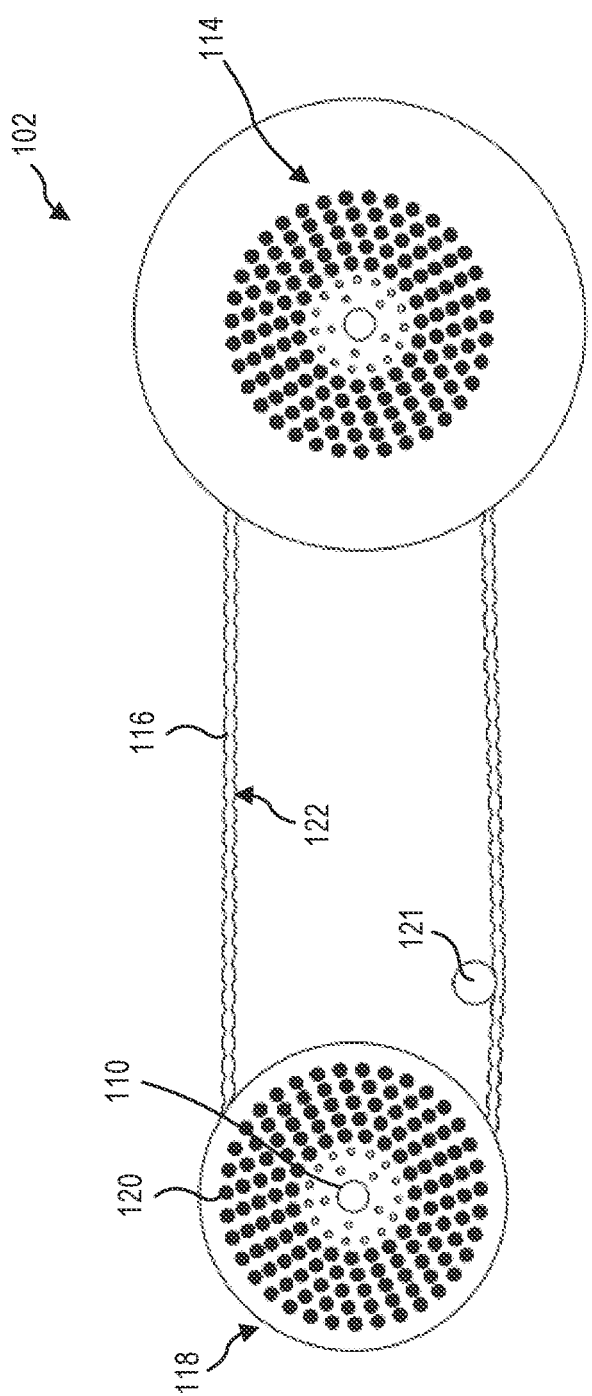
FIG. 5 is a detail view of a gearless drivetrain of FIG. 4 is a third ratio, according to at least one embodiment of the present disclosure.

FIG. 5 illustrates the drivetrain 102 of FIG. 3 with the output radius increased. In some embodiments, a drivetrain 102 according to the present disclosure includes a variable radius output interface 118 between the output shaft 110 and the belt 116. By changing the output radius between the output shaft 110 and the belt 116, the angular velocity of the output shaft 110 relative to the linear velocity of the belt 116 and the force applied by the belt 116 to the output shaft 110 change. The variable radius output interface 118 can change radius in discrete steps by actuating a plurality of pins 120 in concentric rings around the output shaft 110. The concentric rings may be positioned at equal radial intervals, while the pins 120 of each ring are positioned at equal rotational spacing. In other words, the spacing between each pin 120 remains the same as the radius of the output interface 118 changes by actuating the pins 120 or rings of pins 120.

In various embodiments, the pins 120 are actuated by one or more mechanical, electromechanical, magnetic, hydraulic, or pneumatic actuators, or combinations thereof. By actuating the pins 120 in an axial direction of the output shaft 110, transverse to both the tension of the belt 116 and the radial direction of the output shaft 110, the pins 120 can transmit force between the belt 116 and the output interface 118 without the actuator mechanism bearing the force between transmitted therebetween. In at least one embodiment, the drivetrain 102 includes both a variable radius input interface 114 and a variable radius output interface 118.

The ratio of the drivetrain 102 illustrated in FIG. 3 is therefore a high ratio, as the input radius is greater than the output radius. FIG. 4 illustrates the embodiment of FIG. 3 in a lower ratio by deactuating rings (i.e., leaving the rings in or returning the rings to an unactuated state) of the input interface 114 to reduce the input radius. The output radius remains constant, resulting in a lower drive ratio than depicted in FIG. 3. Similarly, FIG. 5 illustrates the embodiment of a drivetrain 102 of FIG. 3 with all rings and pins actuated in both the input interface 114 and the output interface 118, resulting in the input radius and the output radius being equal. In other words, the illustrated embodiment of FIG. 5 depicts a 1:1 drive ratio. In some embodiments, the drivetrain 102 includes a tensioner 121 that applies a force to the belt 116 to maintain tension on the belt as the radius of the input interface 114 and/or output interface 118 changes.

The belt 116 may include a flexible material, a plurality of hinged links, or a combination thereof. In some embodiments, the belt 116 is continuous, endless belt including a flexible material, such as rubber or other polymer, such that the belt 116 is a continuous flexible belt. In some embodiments, the belt 116 includes a series of rigid links moveably connected to one another, such as a continuous, endless chain including, but not limited to, a conventional bicycle chain. In some embodiments, the belt 116 includes rigid links with flexible members therebetween, allowing the rigid links to moved relative to one another.

The belt 116 may include a plurality of engagement features. The engagement features 122 may include protrusions, recesses, teeth, ridges, grooves, or other features in or on the surface of the belt or features positioned through the belt, such as holes. The engagement features 122 allow for mechanical interlocking with a complementary feature in the input interface 114 and/or output interface 118, such as the pins 120 described herein. For example, the belt 116 may include teeth that protrude from an inner surface of the belt 116 to engage with and/or fit between the pins 120 of the interface(s). In some embodiments, the belt 116 includes one or more longitudinal grooves that interlock with or interact with grooves on the pins 120 to assist the belt 116 staying in line with a longitudinal direction of the drivetrain 102.

In some embodiments, the belt 116 is smooth in at least the longitudinal direction of the inner surface. The belt 116 may rely upon frictional engagement with the pins 120 to transmit force between the input shaft and/or output shaft and the belt. The belt 116 may include a layer or coating on the inner surface that has a higher frictional coefficient than a belt body material that provides elastic strength and/or tensile strength to the belt 116. In other examples, the belt 116 may be a rubber material that provides the relatively high frictional coefficient, while being reinforced with an internal material, such as steel braiding, to limit and/or prevent stretching of the belt 116 under load.

Drivetrains 102, and, in particular, the interface(s) 114, 118 with actuatable pins 120, according to the present disclosure are able to vary the radius of the interface(s) 114, 118 without moving the belt 116 laterally relative to the longitudinal direction of the belt 116. This is in contrast to the multiple gears or cogs of a conventional multiple-ratio bicycle drivetrain. A conventional bicycle drivetrain shifts the chain axially between fixed radius gears that are stacked in the axial direction of the crankset or drive axle. When at the extreme ends of the cassette (e.g., the stack of gears), the chain can become cross-loaded and/or bind in the drivetrain. Further, the cassette requires an increased width of the chainstays and the drivetrain relative to embodiment of a drivetrain described herein. In some embodiments, a drivetrain 102 according to the present disclosure can improve aerodynamics, internal friction, weight, and reliability of the drivetrain relative to conventional systems including a cassette and derailleur.

Figure 6:
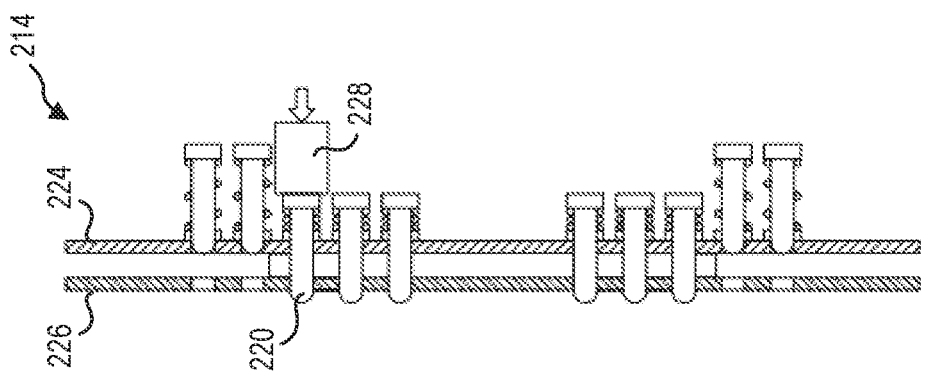
FIG. 6 is a cross-sectional view of a gearless drivetrain with mechanically-actuatable pins, according to at least one embodiment of the present disclosure.

FIG. 6 is a top view of an input interface 214, according to some embodiments of the present disclosure. While an input interface 214 is described, it should be understood that descriptions herein may be applicable to output interfaces, as well. The input interface 214 has a fixed chainline, meaning the chain or other belt (not shown in FIG. 6) does not deflect laterally (i.e., perpendicular to the direction of the chain or belt while moving). The ratio changes by altering which actuatable pins 220 are inserted into the supports of the input interface 214. In some embodiments, the translatable pins 220 are movable at least partially in the axial direction between a first support 224 and a second support 226 such that when actuated, the pin 220 is contacting and supported by both the first support 224 and the second support 226 with the belt 216 positioned between the first support 224 and the second support 226. The first support 224 and the second support 226 can thereby provide support to the pin 220 when under load between the interface and the belt. The supports 224, 226 can bear the force, while the actuator is only needed to move the pins 220 in the axial direction (perpendicular to the belt) when not under load.

In some embodiments, the pins 220 are individually actuatable with at least some of the pins 220 being actuatable independently of any others. For example, each pin 220 may have an independent actuator 228 that moves only that pin 220. In other examples, the pins 220 are rotationally movable (e.g., around an input shaft) relative to an actuator 228, allowing a single actuator 228 to selectively actuate one or more pins 220.

In some embodiments, the actuator 228 is a mechanical actuator with one or more gears to move a rod, ramp, or other surface toward the pin 220. For example, the actuator 228 may move in the axial direction to apply a force to the pin 220. In another example, the actuator 228 may have a ramped surface, and the actuator 228 moves in a radial direction toward or away from the rotational axis of the shaft. The ramped surface may contact the pins 220 as the supports 224, 226 and/or pin 220 rotate around the shaft, and the position of the ramped surface of the actuator 228 may select which pins 220 are contacted by the ramped surface. The contact between the actuator 228 and the pin 220 urges the pin 220 in the axial direction of the rotational axis of the shaft. In some embodiments, the actuator 228 is electromagnetic, magnetic, pneumatic, hydraulic, or combinations thereof. For example, an electromagnet may selectively urge the pin into the supports to engage with the belt, while a pneumatic cylinder returns the pin to the disengaged state. In other examples, a mechanical actuator may selectively urge the pin into the supports to engage with the belt, while a permanent magnet cylinder returns the pin to the disengaged state.

Figure 8:
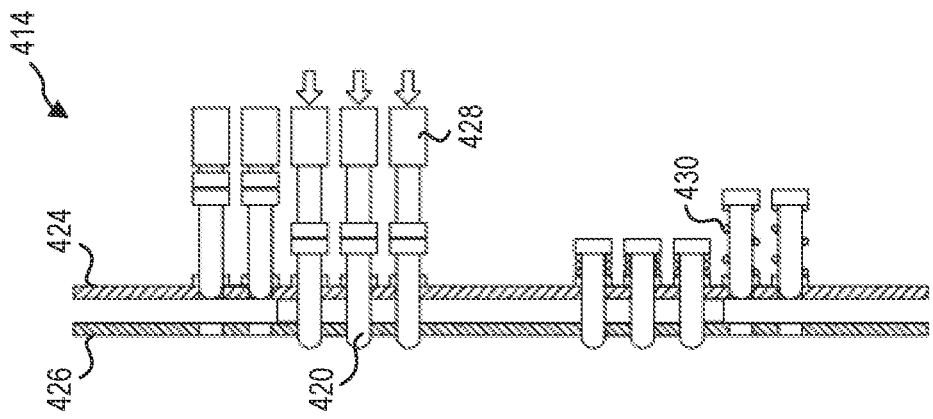
FIG. 8 is a cross-sectional view of a gearless drivetrain with piston-actuatable pins, according to at least one embodiment of the present disclosure.
Figure 7:
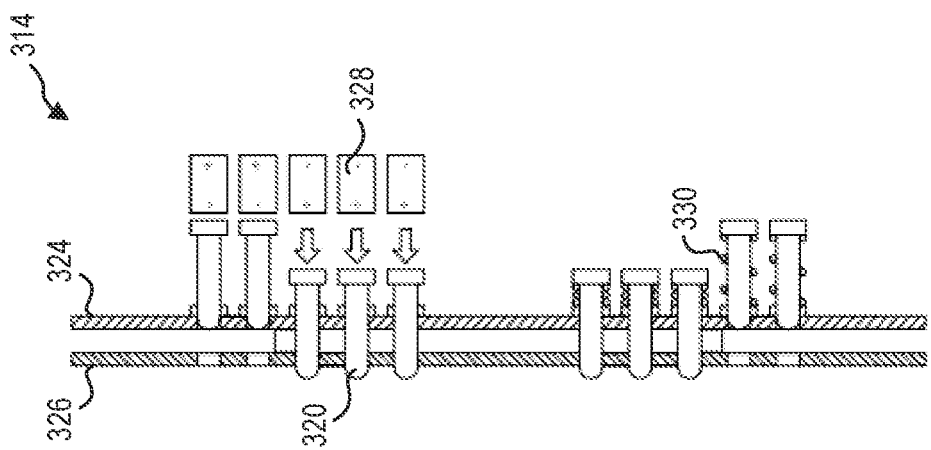
FIG. 7 is a cross-sectional view of a gearless drivetrain with electromechanically-actuatable pins, according to at least one embodiment of the present disclosure.

As illustrated in FIG. 7, some embodiments of an interface 314 use an electromagnetic actuator 328 to apply a repulsive magnetic force to the pins to move the pins 320 into an engaged state with the supports 324, 326 and/or belt. In some embodiments, a spring or other biasing element 330 may then return the pins 320 to the disengaged state. In some embodiments, such as illustrated in FIG. 8, an interface 414 according to the present disclosure uses a pneumatic actuator 428 to apply a mechanical force to the pins 420 to move the pins 420 into an engaged state with the supports 424, 426 and/or belt, and a spring or other biasing element 430 may then return the pins 420 to the disengaged state.

The pins may have a variety of shapes to provide reliable actuation, as well as efficient power transmission. FIG. 9 illustrates a first embodiment of a pin 420, according to the present disclosure. In some embodiments, the pins 420 have a substantially cylindrical shape. For example, a pin 420 may be cylindrical through a contact portion 432 of the pin 420 where the belt contacts the pin 420 when the pin 420 is actuated and engaged with the belt. In some embodiments, the cylindrical contact portion 432 may provide efficient power delivery from the pins to the belt or from the belt to the pins.

The tip 434 of the pin 420 may be rounded or pointed to ensure reliable actuation through the first support and/or second support of the interface. For example, in the event a pin 420 becomes bent or does not fully actuate before the belt contacts the pin, the tip 434 may become misaligned with the hole in the support into which the pin is intended to enter. The rounded or pointed tip 434 may allow a misaligned pin to still enter the hole in the support and engage with both the first support and the second support to efficiently transfer power to or from the belt.

In some embodiments, such as illustrated in FIG. 10, a pin 520 has a tapered contact portion 532. The tapered contact portion 532 may provide a lateral force to the belt to urge the belt in an axial direction along the contact portion 532 to hold the belt in contact with a support and reduce belt vibration. As belt vibration is a potential energy loss, holding the belt in contact with the first support or the second support may allow for more efficient transmission of power from the input shaft to the output shaft. In some embodiments, such as illustrated in FIG. 11, the pin 620 is conical with a tapered contact portion 632 and a pointed tip 634. In some embodiments, such as illustrated in FIG. 12, the pin is frustoconical with a tapered contact portion 732 and a blunt tip 734.

In some embodiments, the pins are rotationally symmetrical around an axial direction of the pins, which allows the pins to rotate in relation to the supports without affecting the performance of the drivetrain. In some embodiments, the pins are rotationally fixed relative to the support(s). Because only the radially outside surface (relative to the rotationally axis of the support(s)) contacts the belt, some embodiments of pins according to the present disclosure may be semi-cylindrical to save weight. Referring now to FIG. 13, a semi-cylindrical pin 820 may have a portion of the contact portion 832 and/or tip 834 removed relative to the rotationally symmetrical designs of FIG. 9-12. The semi-cylindrical pin can provide the same contact surface for the belt to transfer power while reducing the overall mass and, particularly, the rotating mass of the drivetrain.

In some embodiments, a plurality of pins is actuated simultaneously. For example, a batch actuation may allow an entire ring (e.g., a plurality of pins having an equal radius from the rotational axis) to be actuated simultaneously. In other examples, a batch actuation may allow all pins within a ring (e.g., all pins within a radius from the rotational axis) to be actuated simultaneously. In some embodiments, the pins remain actuated throughout a rotation of the interface, such as while the rider pedals the bicycles. In some embodiments, pins actuate for only a portion of the rotational length (e.g., arc length of the ring that is currently engaged with the belt). For example, each interface (input and output interfaces) of the drivetrain will only be engaged with the belt across approximately 50% of the interface. At high ratios, the belt may contact more or less than 50% of the interface. The pins may be actuated for only a portion of the belt path where the belt engages with the interface. In some embodiments, the pins are engaged across at least the portion of the belt path where the belt engages with the interface but less than the entire circumference of the actuated ring.

FIG. 14 illustrates an input interface 914 with the belt 916 contacting a transmission portion 936 of an outer ring of the pins 920 of the interface 914 and the belt 916 not contacting an actuation portion 938 of the outer ring. Within the actuation portion 938, pins 920 in the outer ring, or other rings of the interface 914, may be actuated or unactuated to adjust the effective radius of the interface 914. In some embodiments, the transmission portion 936 is at least 40% (e.g., 144°) of the circumference of the actuated outer ring. In some embodiments, the transmission portion 936 is less than 60% (e.g., 216°) of the circumference of the actuated outer ring. As the pins 920 may experience friction in the axial direction during the transmission portion 936 of the interface 914, actuating the pins 920 during the transmission portion 936 may not be possible.

For example, the pins may selectively actuate by contacting a movable ramp 1040 proximate the first support, such as illustrated in FIG. 15-1 and FIG. 15-2. The movable ramp 1040 contacts a base of the pin 1020 as the pins 1020 rotate around the rotational axis. The ramp surface 1044 of the movable ramp 1040 is an incline surface that urges the pin 1020 in a axial direction relative to the rotational direction 1042 to move the pin 1020 through the first support 1024 toward the second support 1026. In some embodiments, the ramp surface 1044 moves the pin 1020 to an engaged position with the first support 1024 and second support 1026 and a second surface 1046 holds the pins 1020 in the engaged position as the pins 1020 move through an arcuate path around the rotational axis. In some embodiments, the ramp surface 1044 moves the pin 1020 to an engaged position with the first support 1024 and second support 1026 and a catch, clasp, detent, latch, or other mechanical retention mechanism retains the pins 1020 in the engaged position. For example, the ramp surface 1044 may urge the pin 1020 toward the engaged position and a detent in the pin may engage with the second support 1026 to retain the pin in the engaged position.

The pins 1020 may rotate through the transmission portion of rotational movement during which the pins in the transmission portion are actuated and in the engaged position. The power transmission belt 1016 or chain is engaged with the pins 1020 during the transmission portion until the pins 1020 approach the actuation portion of the rotational movement. In some embodiments, the actuated pins 1020 may disengage and/or be released at the start of the actuation portion to allow different pins 1020 to be actuated by the ramp, motors, pistons, magnets, etc. as described herein. In some embodiments, the actuated pins 1020 may remain in the engaged position until a different ring of pins is selected by the drivetrain. For example, the ramped surface or other engagement mechanism may urge the pins 1020 toward the engaged position, in which the pins 1020 will remain engaged until the ramped surface or other engagement mechanism selects a second ring (having a lesser or greater diameter than the currently actuated ring.

In some embodiments, the angular position of the engagement point 1048 (e.g., the start of the transmission portion whether the pins remain engaged throughout a rotation or not) is relative to transmission axis 1050 between the input axis and the output axis. It should be understood that the engagement point 1048 may be altered by changing the path of the chain or belt 1016 between the input interface 1014 and the output interface, such as through idler pullies. In some embodiments, the engagement point 1048 is approximately 90° from the transmission axis 1050 between the input axis and the output axis. For example, when the input interface 1014 and output interface have an equal radius of the selected pins 1020 or gear, the engagement point 1048 may be 90° from the transmission axis 1050 (except for chain sag). As the radius of the input interface 1014 and/or output interface changes, the angular position of the engagement point 1048 may change due to changes in the angle of the chain or belt 1016.

In some embodiments, the engagement point 1048 of at least one of the input interface and the output interface is between 70° and 110° from the transmission axis 1050. In some embodiments, the engagement point 1048 of at least one of the input interface and the output interface is between 75° and 105° from the transmission axis 1050. In some embodiments, the engagement point 1048 of at least one of the input interface and the output interface is between 80° and 100° from the transmission axis 1050.

In some embodiments, the actuation region of at least one of the input interface and the output interface is less than 180° of the rotational movement of the input interface and the output interface, respectively. In some embodiments, the actuation region of at least one of the input interface and the output interface is less than 160° of the rotational movement of the input interface and the output interface, respectively. In some embodiments, the actuation region of at least one of the input interface and the output interface is less than 140° of the rotational movement of the input interface and the output interface, respectively. In some embodiments, the transmission portion of the input interface and/or output interface is the remaining portion of the rotational movement.

Pedaled drivetrains according to the present disclosure allow for a single chainline between the input interface and output interface, reducing wear and drag on the belt or chain, which improves operational lifetime of components and efficiency of the drivetrain. In some embodiments, pedaled drivetrains according to the present disclosure may reduce weight and/or allow wireless actuation to further improve bicycle performance.

Because the belt or chain engages with transverse pins instead of radially oriented teeth, the belt or chain may have different properties and/or geometry from a conventional bike chain. For example, conventional belts or chains receive teeth of the gears or cogs in openings or recesses between the pins of each link. In some embodiments according to the present disclosure, a bicycle chain for transmitting power between an input axis and an output axis includes teeth projecting transversely from at least one side of the link between the pins of each link.

Figure 16:
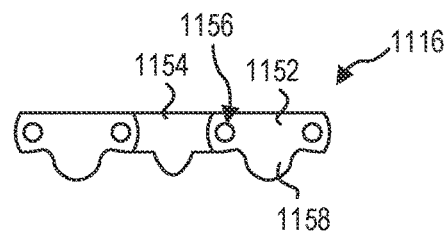
FIG. 16 is a detail view of a power transmission chain for use with any system described herein, according to at least one embodiment of the present disclosure.

FIG. 16 is a side view of a portion of an embodiment of a chain belt 1116 according to the present disclosure. In some embodiments, the chain belt 1116 includes a plurality of outer links 1152 and inner links 1154 connected by hinges 1156. The hinges 1156 may be connected by the insertion of a pin through the outer link 1152 and through the inner link 1154 to connect the outer link 1152 to the inner link 1154 in a rotatable hinge 1156. In some embodiments, the links 1152, 1154 may be connected through a compression fit of protrusions into detents. For example, the outer links 1152 may have protrusions that fit into detents in the inner links 1154, or the inner links 1154 may have protrusions that fit into detents in the outer links 1152.

Figure 17:
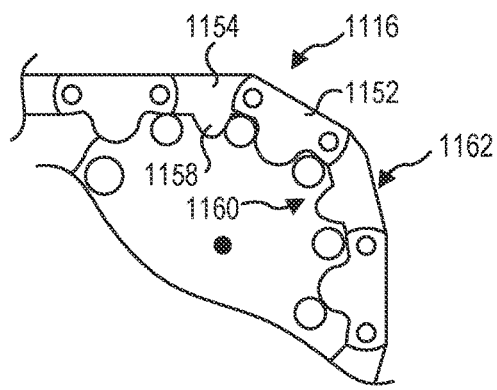
FIG. 17 is a side view of a system including the power transmission chain of FIG. 15, according to at least one embodiment of the present disclosure.

In some embodiments, the chain belt 1116 includes a plurality of teeth 1158 on the chain belt 1116 to engage between the pins. FIG. 17 illustrates the teeth 1158 located on the inward face of the loop formed by the chain belt 1116 around the input axis and the output axis. The tooth 1158 is located longitudinally between the hinge connections of the link 1152, 1154. In some embodiments, each link of the chain belt 1116 includes at least one tooth 1158. In some embodiments, at least one link of the chain belt 1116 includes a plurality of teeth 1158. In some embodiments, at least one link has a tooth 1158 on both the inward face 1160 of the chain belt 1116 and an outward face 1162 of the chain belt 1116. For example, some embodiments of a drivetrain according to the present disclosure may include jockey wheels or idler pulleys to direct the chain belt 1116 around the drivetrain during suspension movement or during shifting. Teeth on both faces 1160, 1162 of the chain belt 1116 may allow the chain belt 1116 to engage with a jockey wheel or idler pulley to remain in the chainline and/or under tension.

In some embodiments, a flexible continuous belt with inward-facing teeth or protrusions may be used to transmit power from the input axis to the output axis. For example, a flexible continuous belt may provide a smooth outer surface with less connections to limit and/or prevent dirt ingress and wear. The flexible continuous belt may present a smooth outer surface that improves safety, as well, as objects are less likely to be caught in the belt than a hinged chain.

Figure 18:
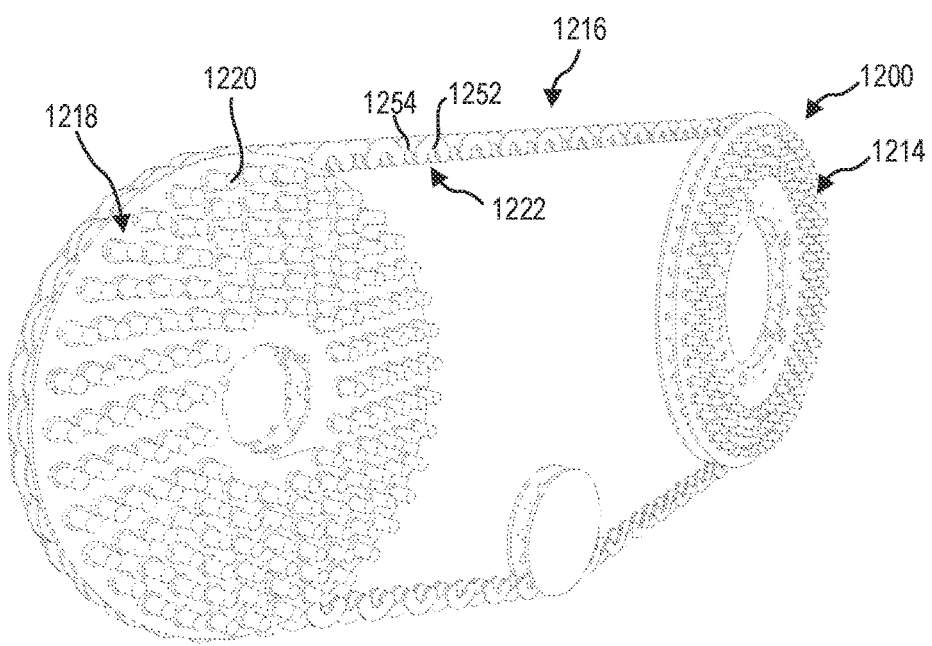
FIG. 18 is a perspective view of a drivetrain, according to at least one embodiment of the present disclosure.

FIG. 18 is a perspective view of another embodiment of a drivetrain 1200 according to the present disclosure. While FIG. 18 illustrates the drivetrain 1200 with the pins 1220 of the input interface 1214 and output interface 1218 disengaged, any number or combination of pins 1220 may be engaged to adjust the drive ratio between the input interface 1214 and output interface 1218. In some embodiments, a chain belt 1216 includes a plurality of links 1252, 1254 to contact and engage with the pins 1220 of the interfaces 1214, 1218. The plurality of outer links 1252 and inner links 1254 each have a recess 1222 positioned between connecting hinges 1256.

Figures 1, 19:
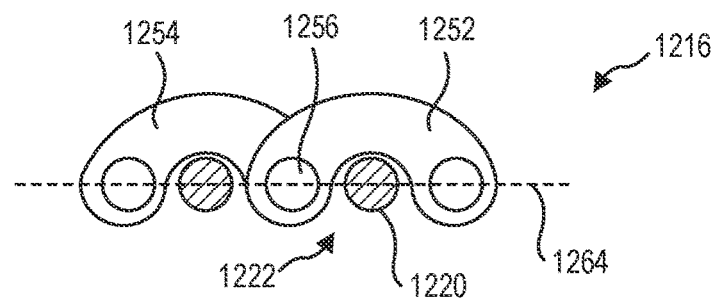
Figures 2, 19:
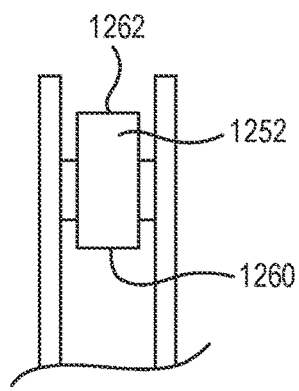

The recesses 1222 are positioned to allow the pins 1220 to engage with the links between the hinges 1256. For example, FIG. 19-1 illustrates a segment of the chain belt 1216 of FIG. 18. The outer links 1252 and inner links 1254 are curved or arched to provide recesses 1222 into which the pins 1220 may fit. The hinges 1256 and pins 1220 are aligned along a chain axis 1264 such that the center of the pins 1220 are aligned between the center of the hinges 1256. Alignment of the pins 1220 and hinges 1256 may allow for more efficient power transmission between the interface and the chain belt 1216. Additionally, alignment of the pins 1220 and hinges 1256 may allow for less wear on the chain belt 1216 as the forces applied by the pins 1220 are aligned with the connections between the links 1252, 1254. To further align the chain belt in the interface, as shown in FIG. 19-2, at least the outer link 1252 may be tapered from the outer surface 1262 to the inner surface 1260. The taper may contact the first support 1224 and/or outer guard 1226 to center the outer link 1252.

Figure 20:
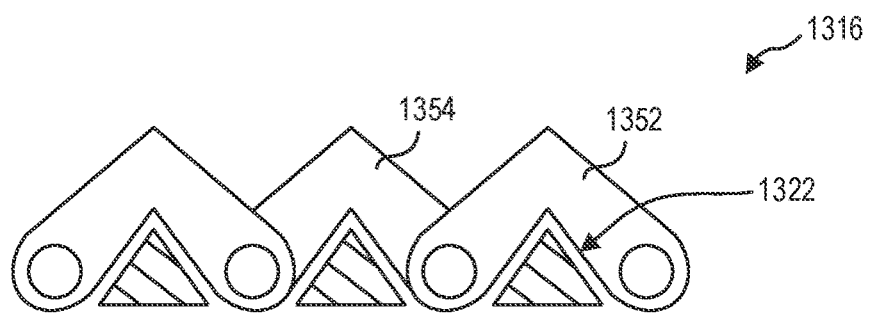
FIG. 20 is another chain belt contacting a plurality of pins, according to at least one embodiment of the present disclosure.

Referring now to FIG. 20 the description herein describes the pins as round, in some embodiments, the pins 1320 of the input interface and/or output interface may have other cross-sectional shapes, such as triangular, square, rectangular, oval, pentagonal, other regular polygonal shape, irregular polygonal shapes, irregular curved shapes, or combinations thereof. The recess 1322 and the pins 1320 may be complementarily shaped to efficiently transfer power between the pins 1320 of the input interface and/or output interface and the links 1352, 1354.

In other embodiments, a high-resolution input interface and/or output interface includes a dense array 1466 of pins 1420, as shown in FIG. 21-1, FIG. 21-2, and FIG. 21-3. The input interface 1414 includes a high density of pins 1420, such as pins with a diameter of less than 2.0 mm, 1.5 mm, or 1.0 mm. The array 1466 of pins 1420 is positioned to allow a variety of engagement profiles 1468-1, 1468-2, 1468-3 to interact with a belt, such as any of the flexible or chain belts described herein. In some embodiments, the array 1466 of pins allows a first engagement profile 1466-1 with a plurality of lobes 1470 that are complementarily shaped to the recesses of the belt. The high-resolution array 1466 allows for the formation of a variety of engagement profiles with different radii, permitting a substantially continuously variable drive ratio for the input interface 1414 and/or output interface. In some embodiments, the high-resolution array 1466 is changed in response to measurements from a torque sensor in the crank or in the input interface 1414. For example, the high-resolution array 1466 may change engagement profiles 1468-1, 1468-2, 1468-3 to compensate for variations in the user's input torque throughout the pedal stroke.

Figures 1, 21:
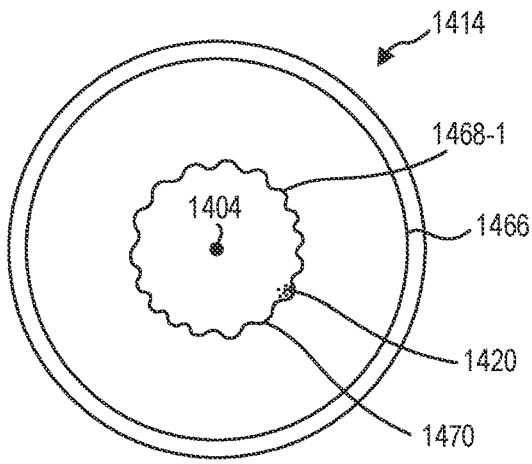
Figures 2, 21:
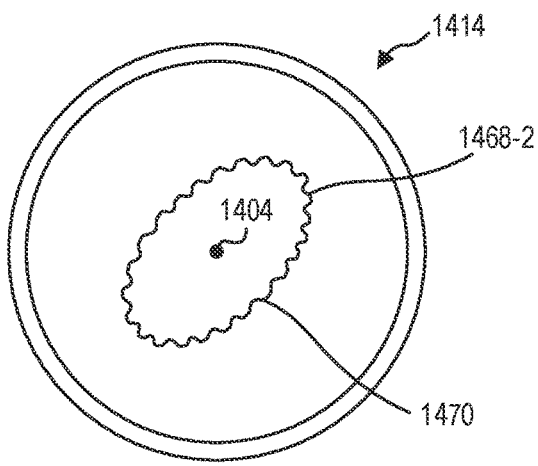
Figures 3, 21:
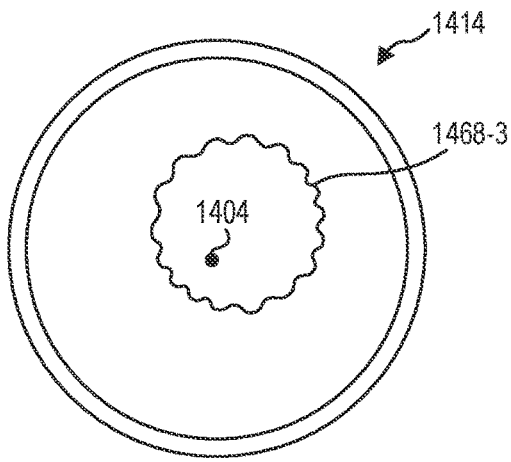

For example, FIG. 21-2 illustrates the input interface 1414 of FIG. 21-1 with a second engagement profile 1468-2. The second engagement profile 1468-2 has an oval profile that allows the input interface 1414 to change the torque applied to the input axis 1404 based on the position of the pedals in the rider's stroke. For example, when the crankarms are level to the ground, the rider may apply a greater force to the crankset and, when the crankarms are perpendicular to the ground, the rider may apply a lesser force to the crankset. An oval second engagement profile 1468-2 may change the torque applied to the input axis 1404 by changing the lever arm over which the force is applied.

In other examples, the engagement profile has other non-circular shapes, such as in FIG. 21-3, which illustrates the input interface 1414 of FIG. 21-1 with a third engagement profile 1468-3. The third engagement profile 1468-3 is circular, but eccentric, around the input shaft 1404. Again, because the force applied to the crankset by the rider's pedal stroke can vary in force throughout the stroke, an eccentric third engagement profile 1468-3 may change the torque applied to the input axis 1404 by changing the lever arm over which the force is applied.

INDUSTRIAL APPLICABILITY

This disclosure generally relates to drivetrains including a chain or cable for power transmission from an input shaft to an output shaft. More particularly, this disclosure relates to bicycle drivetrains that are primarily or exclusively pedal-driven and/or human-powered, but drivetrains systems according to the present disclosure may be applicable to electric or convention internal combustion engine (ICE) drivetrains in a variety of vehicles or devices.

In some embodiments, the bicycle includes a drivetrain that converts an input torque around an input shaft connected to the crankarms and pedals to an output torque around an output shaft connected to the rear wheel. The drivetrain includes an input interface that connects the input shaft to a belt, which is, in turn, connected to an output interface connected to the output shaft.

In some embodiments, a drivetrain according to the present disclosure transmits power from an input shaft to an output shaft through a variable ratio. A drivetrain, according to some embodiments of the present disclosure includes an input shaft and output shaft that are connected by a belt. The belt transmits a torque applied to the input shaft through the belt to apply a torque to the output shaft. In some embodiments, the input shaft is a crankset, such as on a bicycle or other pedal-driven device. In some embodiments, the input shaft is a crankshaft, such as on a motorcycle or other motor-driven device. In some embodiments, the output shaft is a drive axle, such as on a bicycle or other wheeled vehicle. In some embodiments, the output shaft is another drive shaft, such as on a propeller or other rotational device. In some embodiments, the output shaft of the drivetrain is an input shaft for another system or device. The drivetrain allows for variable ratios to provide a mechanical advantage or conversion between the input torque and input velocity at the input shaft and the output torque and output velocity at the output shaft.

The drive ratio is determined by the ratio of an input radius of the input interface relative to an output radius of the output interface. In some embodiments, the input interface or output interface is a fixed radius, such as a single gear. In some embodiments, both the input interface and output interface are variable radius interfaces that use concentric rings of pins. The darkened pins in the illustrated embodiment indicate actuated pins that are engaged between a first support and a second support to interact with the belt.

In some embodiments, each ring of the concentric rings of the interface may be actuatable independently of the other rings. In some embodiments, the interface actuates all pins within (i.e., closer to the axis of the interface) the outermost actuated ring. For example, when the outermost ring of the input interface is actuated, therefore, all rings, and all pins, of the input interface may be actuated. In another example, the output interface has the second ring (in the radially outward direction from the axis) as the outermost actuated ring, so the pins of the second ring and the first ring are actuated while the rings outside of the second ring (third, fourth, fifth rings) are not actuated.

The pins may be actuated through one or more of actuation mechanisms, either directly or indirectly. In some embodiments, the pins are individually actuatable. In some embodiments, the pins are actuatable in batches of two or more, such as actuating an entire ring simultaneously or substantially simultaneously. Substantially simultaneously should be understood as actuating an entire ring within a single revolution of the ring around the axis.

In some embodiments, a drivetrain according to the present disclosure includes a variable radius interface between the input shaft and the belt. By changing the input radius between the input shaft and the belt, the linear velocity of the belt and the force applied to the belt change. The variable radius input interface can change radius in discrete steps by actuating a plurality of pins in concentric rings around the input shaft. In various embodiments, the pins are actuated by one or more mechanical, electromechanical, magnetic, hydraulic, or pneumatic actuators, or combinations thereof. By actuating the pins in an axial direction of the input shaft, transverse to both the tension of the belt and the radial direction of the input shaft, the pins can transmit force between the interface and the belt without the actuator mechanism bearing the force between transmitted therebetween.

In some embodiments, a drivetrain according to the present disclosure includes a variable radius interface between the output shaft and the belt. By changing the output radius between the output shaft and the belt, the angular velocity of the output shaft relative to the belt and the force applied by the belt to the output shaft change. The variable radius output interface can change radius in discrete steps by actuating a plurality of pins in concentric rings around the output shaft. In various embodiments, the pins are actuated by one or more mechanical, electromechanical, magnetic, hydraulic, or pneumatic actuators, or combinations thereof. By actuating the pins in an axial direction of the output shaft, transverse to both the tension of the belt and the radial direction of the output shaft, the pins can transmit force between the belt and the interface without the actuator mechanism bearing the force between transmitted therebetween. In at least one embodiment, the drivetrain includes both a variable radius input interface and a variable radius output interface.

In some instances, the ratio of the drivetrain is a high ratio, such as when the input radius is greater than the output radius. In some instances, the ratio of the drivetrain is a low ratio, such as when deactuating rings (i.e., leaving the rings in or returning the rings to an unactuated state) of the input interface to reduce the input radius. Similarly, when all rings and pins are actuated in both the input interface and the output interface, the input radius and the output radius may be equal. In other words, the when the input ring and output ring are the same radius, the drivetrain has a 1:1 drive ratio.

The belt may include a flexible material, a plurality of hinged links, or a combination thereof. In some embodiments, the belt is continuous, endless belt including a flexible material, such as rubber or other polymer, such that the belt is a continuous flexible belt. In some embodiments, the belt includes a series of rigid links moveably connected to one another, such as a continuous, endless chain including, but not limited to, a conventional bicycle chain. In some embodiments, the belt includes rigid links with flexible members therebetween, allowing the rigid links to moved relative to one another.

The belt may include a plurality of engagement features. The engagement features may include protrusions, recesses, teeth, ridges, grooves, or other features in or on the surface of the belt or features positioned through the belt, such as holes. The engagement features allow for mechanical interlocking with a complementary feature in the interface, such as the pins described herein. For example, the belt may include teeth that protrude from an inner surface of the belt to engage with and/or fit between the pins of the interface(s). In some embodiments, the belt includes one or more longitudinal grooves that interlock with or interact with grooves on the pins to assist the belt staying in line with a longitudinal direction of the drivetrain.

In some embodiments, the belt is smooth in at least the longitudinal direction of the inner surface. The belt may rely upon frictional engagement with the pins to transmit force between the input shaft and/or output shaft and the belt. The belt may include a layer or coating on the inner surface that has a higher frictional coefficient than a belt body material that provides elastic strength and/or tensile strength to the belt. In other examples, the belt may be a rubber material that provides the relatively high frictional coefficient, while being reinforced with an internal material, such as steel braiding, to limit and/or prevent stretching of the belt under load.

Drivetrains, and, in particular, the interface(s) with actuatable pins, according to the present disclosure are able to vary the radius of the interface(s) without moving the belt laterally. This is in contrast to the multiple gears or cogs of a conventional multiple-ratio bicycle drivetrain. A conventional bicycle drivetrain shifts the chain axially between fixed radius gears that are stacked in the axial direction of the crankset or drive axle. When at the extreme ends of the cassette (e.g., the stack of gears), the chain can become cross-loaded and/or bind in the drivetrain. Further, the cassette requires an increased width of the chainstays and the drivetrain relative to embodiment of a drivetrain described herein. In some embodiments, a drivetrain according to the present disclosure can improve aerodynamics, internal friction, weight, and reliability of the drivetrain relative to conventional systems including a cassette and derailleur.

In some embodiments, the input interface has a fixed chainline, meaning the chain or other belt does not deflect laterally (i.e., perpendicular to the direction of the chain or belt while moving). The ratio changes by altering which actuatable pins are inserted into the supports of the input interface. In some embodiments, the translatable pins are movable at least partially in the axial direction between a first support and a second support such that when actuated, the pin is contacting and supported by both the first support and the second support with the belt positioned between the first support and the second support. The first support and the second support can thereby provide support to the pin when under load between the interface and the belt. The supports can bear the force, while the actuator is only needed to move the pins in the axial direction (perpendicular to the belt) when not under load.

In some embodiments, the pins are individually actuatable with at least some of the pins being actuatable independently of any others. For example, each pin may have an independent actuator that moves only that pin. In other examples, the pins are rotationally movable (e.g., around an input shaft) relative to an actuator, allowing a single actuator to selectively actuate one or more pins.

In some embodiments, the actuator is a mechanical actuator with one or more gears to move a rod, ramp, or other surface toward the pin. For example, the actuator may move in the axial direction to apply a force to the pin. In another example, the actuator may have a ramped surface, which moves in a radial direction toward or away from the rotational axis of the shaft. The ramped surface may contact the pins as the supports and/or pin rotate around the shaft, and the position of the ramped surface may select which pins are contacted by the ramped surface. The contact between the actuator and the pin urges the pin in the axial direction of the rotational axis of the shaft. In some embodiments, the actuator is electromagnetic, magnetic, pneumatic, hydraulic, or combinations thereof. For example, an electromagnet may selectively urge the pin into the supports to engage with the belt, while a pneumatic cylinder returns the pin to the disengaged state. In other examples, a mechanical actuator may selectively urge the pin into the supports to engage with the belt, while a permanent magnet cylinder returns the pin to the disengaged state.

Some embodiments use an electromagnetic actuator to apply a repulsive magnetic force to the pins to move the pins into an engaged state with the supports and/or belt. In some embodiments, a spring or other biasing element may then return the pins to the disengaged state. In some embodiments, a drivetrain according to the present disclosure uses a pneumatic actuator to apply a mechanical force to the pins to move the pins into an engaged state with the supports and/or belt a spring or other biasing element may then return the pins to the disengaged state.

The pins may have a variety of shapes to provide reliable actuation, as well as efficient power transmission. In some embodiments, the pins have a substantially cylindrical shape. For example, a pin may be cylindrical through a contact portion of the pin where the belt contacts the pin when the pin is actuated and engaged with the belt. In some embodiments, the cylindrical contact portion may provide efficient power delivery from the pins to the belt or from the belt to the pins.

The tip of the pin may be rounded or pointed to ensure reliable actuation through the first support and/or second support of the interface. For example, in the event a pin becomes bent or does not fully actuate before the belt contacts the pin, the tip may become misaligned with the hole in the support into which the pin is intended to enter. The rounded or pointed tip may allow a misaligned pin to still enter the hole in the support and engage with both the first support and the second support to efficiently transfer power to or from the belt.

In some embodiments, a pin has a tapered contact portion. The tapered contact portion may provide a lateral force to the belt to urge the belt in an axial direction along the contact portion to hold the belt in contact with a support and reduce belt vibration. As belt vibration is a potential energy loss, holding the belt in contact with the first support or the second support may allow for more efficient transmission of power from the input shaft to the output shaft. In some embodiments, the pin is conical with a tapered contact portion and a pointed tip. In some embodiments, the pin is frustoconical with a tapered contact portion and a blunt tip.

In some embodiments, the pins are rotationally symmetrical around an axial direction of the pins, which allows the pins to rotate in relation to the supports without affecting the performance of the drivetrain. In some embodiments, the pins are rotationally fixed relative to the support(s). Because only the radially outside surface (relative to the rotationally axis of the support(s)) contacts the belt, some embodiments of pins according to the present disclosure may be semi-cylindrical to save weight. In some embodiments, a semi-cylindrical pin may have a portion of the contact surface and/or tip removed relative to the rotationally symmetrical designs. The semi-cylindrical pin can provide the same contact surface for the belt to transfer power while reducing the overall mass and, particularly, the rotating mass of the drivetrain.

In some embodiments, a plurality of pins is actuated simultaneously. For example, a batch actuation may allow an entire ring (e.g., a plurality of pins having an equal radius from the rotational axis) to be actuated simultaneously. In other examples, a batch actuation may allow all pins within a ring (e.g., all pins within a radius from the rotational axis) to be actuated simultaneously. In some embodiments, the pins remain actuated throughout a rotation of the interface, such as while the rider pedals the bicycle. In some embodiments, pins actuate for only a portion of the rotational length of the interface (e.g., an arc length of the ring that is currently engaged with the belt). For example, each interface (input and output interfaces) of the drivetrain may only be engaged with the belt across approximately 50% of the interface. At high ratios, the belt may contact more or less than 50% of the interface. The pins may be actuated for only a portion of the belt path where the belt engages with the interface. In some embodiments, the pins are engaged across at least the portion of the belt path where the belt engages with the interface but less than the entire circumference of the actuated ring.

In some embodiments, within the actuation portion, pins in the outer ring, or other rings of the interface, may be actuated or unactuated to adjust the effective radius of the interface. In some embodiments, the transmission portion is at least 40% (e.g., 144°) of the circumference of the actuated outer ring. In some embodiments, the transmission portion is less than 60% (e.g., 216°) of the circumference of the actuated outer ring. As the pins may experience friction in the axial direction during the transmission portion of the interface, actuating the pins during the transmission portion of the interface may not be possible.

For example, the pins may selectively actuate by contacting a movable ramp proximate the first support. The movable ramp contacts a base of the pin as the pins rotate around the rotational axis. The ramp surface of the movable ramp is an incline surface that urges the pin in a transverse direction relative to the rotational direction to move the pin through the first support toward the second support. In some embodiments, the ramp surface moves the pin to an engaged position with the first support and second support and a second surface holds the pins in the engaged position as the pins move through an arcuate path around the rotational axis. In some embodiments, the ramp surface moves the pin to an engaged position with the first support and second support and a catch, clasp, detent, latch, or other mechanical retention mechanism retains the pins in the engaged position. For example, the ramp surface may urge the pin toward the engaged position and a detent in the pin may engage with the second support to retain the pin in the engaged position.

The pins may rotate through the transmission portion of rotational movement during which the pins in the transmission portion are actuated and in the engaged position. The power transmission belt or chain is engaged with the pins during the transmission portion until the pins approach the actuation portion of the rotational movement. In some embodiments, the actuated pins may disengage and/or be released at the start of the actuation portion to allow different pins to be actuated by the ramp, motors, pistons, magnets, etc. as described herein. In some embodiments, the actuated pins may remain in the engaged position until a different ring of pins is selected by the drivetrain. For example, the ramped surface or other engagement mechanism may urge the pins toward the engaged position, in which the pins will remain engaged until the ramped surface or other engagement mechanism selects a second ring (having a lesser or greater diameter than the currently actuated ring.

In some embodiments, the angular position of the engagement point (e.g., the start of the transmission portion whether the pins remain engaged throughout a rotation or not) is relative to an axis between the input axis and the output axis. It should be understood that the engagement point may be altered by changing the path of the chain or belt between the input interface and the output interface, such as through idler pullies. In some embodiments, the engagement point is approximately 90° from the transmission axis between the input axis and the output axis. For example, when the input interface and output interface have an equal radius of the selected pins or gear, the engagement point may be 90° from the transmission axis (except for chain sag). As the radius of the input interface and/or output interface changes, the angular position of the engagement point may change due to changes in the angle of the chain or belt.

In some embodiments, the engagement point of at least one of the input interface and the output interface is between 70° and 110° from the transmission axis. In some embodiments, the engagement point of at least one of the input interface and the output interface is between 75° and 105° from the transmission axis. In some embodiments, the engagement point of at least one of the input interface and the output interface is between 80° and 100° from the transmission axis.

In some embodiments, the actuation region of at least one of the input interface and the output interface is less than 180° of the rotational movement of the input interface and the output interface, respectively. In some embodiments, the actuation region of at least one of the input interface and the output interface is less than 160° of the rotational movement of the input interface and the output interface, respectively. In some embodiments, the actuation region of at least one of the input interface and the output interface is less than 140° of the rotational movement of the input interface and the output interface, respectively. In some embodiments, the transmission portion of the input interface and/or output interface is the remaining portion of the rotational movement.

Pedaled drivetrains according to the present disclosure allow for a single chainline between the input interface and output interface, reducing wear and drag on the belt or chain, which improves operational lifetime of components and efficiency of the drivetrain. In some embodiments, pedaled drivetrains according to the present disclosure may reduce weight and/or allow wireless actuation to further improve bicycle performance.

Because the belt or chain engages with transverse pins instead of radially oriented teeth, the belt or chain may have different properties and/or geometry from a conventional bike chain. For example, conventional belts or chains receive teeth of the gears or cogs in openings or recesses between the pins of each link. In some embodiments according to the present disclosure, a bicycle chain for transmitting power between an input axis and an output axis includes teeth projecting transversely from at least one side of the link between the pins of each link.

In some embodiments, the chain includes a plurality of outer links and inner links connected by hinges. The hinges may be connected by the insertion of a pin through the outer link and through the inner link to connect the outer link to the inner link in a rotatable hinge. In some embodiments, the links may be connected through a compression fit of protrusions into detents. For example, the outer links may have protrusions that fit into detents in the inner links, or the inner links may have protrusions that fit into detents in the outer links.

In some embodiments, the chain includes a plurality of teeth on the chain to engage between the pins. In some embodiments, the tooth is located longitudinally between the hinge connections of the link. In some embodiments, each link of the chain includes at least one tooth. In some embodiments, at least one link of the chain includes a plurality of teeth. In some embodiments, at least one link has a tooth on both the inward face of the chain and an outward face of the chain. For example, some embodiments of a drivetrain according to the present disclosure may include jockey wheels or idler pulleys to direct the chain around the drivetrain during suspension movement or during shifting. Teeth on both faces of the chain may allow the chain to engage with a jockey wheel or idler pulley to remain in the chainline and/or under tension.

In some embodiments, a flexible belt with inward-facing teeth or protrusions may be used to transmit power from the input axis to the output axis. For example, a flexible belt may provide a smooth outer surface with less connections to limit and/or prevent dirt ingress and wear. The flexible belt may present a smooth outer surface that improves safety, as well, as objects are less likely to be caught in the belt than a hinged chain.

In some embodiments, a chain belt includes a plurality of links to contact and engage with the pins of the interfaces. The plurality of outer links and inner links each have a recess positioned between connecting hinges.

The recesses are positioned to allow the pins to engage with the links between the hinges. The outer links and inner links may be curved or arched to provide recesses into which the pins may fit. The hinges and pins are aligned along a chain axis such that the center of the pins are aligned between the center of the hinges. Alignment of the pins and hinges may allow for more efficient power transmission between the interface and the chain belt. Additionally, alignment of the pins and hinges may allow for less wear on the chain belt as the forces applied by the pins are aligned with the connections between the links. To further align the chain belt in the interface, at least the outer link may be tapered from the outer surface to the inner surface. The taper may contact the first support and/or outer guard to center the outer link.

The description herein describes the pins as round, in some embodiments, the pins of the input interface and/or output interface may have other cross-sectional shapes, such as triangular, square, rectangular, oval, pentagonal, other regular polygonal shape, irregular polygonal shapes, irregular curved shapes, or combinations thereof. The recess and the pins may be complementarily shaped to efficiently transfer power between the pins of the input interface and/or output interface and the links.

In other embodiments, a high-resolution input interface and/or output interface includes a dense array of pins. The input interface includes a high density of pins, such as pins with a diameter of less than 2.0 mm, 1.5 mm, or 1.0 mm. The array of pins is positioned to allow a variety of engagement profiles to interact with a belt, such as any of the flexible or chain belts described herein. In some embodiments, the array of pins allows a first engagement profile with a plurality of lobes that are complementarily shaped to the recesses of the belt. The high-resolution array allows for the formation of a variety of engagement profiles with different radii, permitting a substantially continuously variable drive ratio for the input interface and/or output interface.

A second engagement profile may have an oval profile that allows the input interface to change the torque applied to the input axis 1404 based on the position of the pedals in the rider's stroke. For example, when the crankarms are level to the ground, the rider may apply a greater force to the crankset and, when the crankarms are perpendicular to the ground, the rider may apply a lesser force to the crankset. An oval second engagement profile may change the torque applied to the input axis by changing the lever arm over which the force is applied.

In other examples, the engagement profile has other non-circular shapes. A third engagement profile may be circular, but eccentric, around the input shaft. Again, because the force applied to the crankset by the rider's pedal stroke can vary in force throughout the stroke, an eccentric third engagement profile may change the torque applied to the input axis by changing the lever arm over which the force is applied.

The articles "a," "an," and "the" are intended to mean that there are one or more of the elements in the preceding descriptions. The terms "comprising," "including," and "having" are intended to be inclusive and mean that there may be additional elements other than the listed elements.

Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A pedal drivetrain, the drivetrain comprising:
an input interface;
an output interface; and
a power transmission belt engaged with the input interface and output interface to transmit force from the input interface to the output interface,
wherein at least one of the input interface and the output interface includes a plurality of movable pins engaged with the power transmission belt and wherein at least one of the pins is at least partially conical with a tapered contact portion.

2. The drivetrain of claim 1, wherein the plurality of movable pins is positioned in a plurality of concentric rings around a rotational axis.

3. The drivetrain of claim 2, wherein: a first concentric ring has a first radius and a first rotational spacing between pins; and
a second concentric ring has a second radius and a second rotational spacing between pins, wherein the first radius and second radius are different and the first rotational spacing between pins and second rotational spacing between pins are equal.

4. The drivetrain of claim 1, further comprising an actuator to move at least one pin of the plurality of movable pins from a disengaged state to an engaged state.

5. The drivetrain of claim 4, wherein the actuator is a mechanical actuator.

6. The drivetrain of claim 4, wherein the actuator is an electromagnetic actuator.

7. The drivetrain of claim 4, wherein the actuator is a pneumatic actuator.

8. The drivetrain of claim 4, wherein the actuator includes a ramped surface that contacts the at least one pin to move the at least one pin.

9. The drivetrain of claim 1, wherein at least one of the input interface and output interface includes a first support and a second support.

10. The drivetrain of claim 9, wherein at least one pin of the plurality of pins is movable between an engaged state and a disengaged state, where the at least one pin is positioned through the first support and second support in the engaged state.

11. The drivetrain of claim 1, wherein at least one pin of the plurality of movable pins is frustoconical.

12. The drivetrain of claim 1, wherein at least one pin of the plurality of movable pins has a round tip.

13. The drivetrain of claim 1, wherein at least one pin of the plurality of movable pins has an engagement feature that retains the at least one pin in an engaged state.

14. The drivetrain of claim 1, wherein the power transmission belt includes a plurality of links.

15. A pedal drivetrain, the drivetrain comprising:
an input interface;
an output interface; and
a power transmission belt engaged with the input interface and output interface to transmit force from the input interface to the output interface,
wherein the input interface and the output interface include a plurality of movable pins engaged with the power transmission belt and the plurality of movable pins is positioned in a plurality of concentric rings around a rotational axis and at least one movable pin is at least partially conical with a tapered contact surface.

16. The drivetrain of claim 15, further comprising a belt tensioner to apply a force to the power transmission belt.

17. The drivetrain of claim 15, wherein the power transmission belt is a chain belt that includes a plurality of links wherein at least one link includes a tooth longitudinally between hinged connections.

18. The drivetrain of claim 15, wherein the power transmission belt is a flexible continuous belt.

19. A pedal drivetrain, the drivetrain comprising:
an input interface;
a crankset connected to the input interface to transmit torque from pedals to the input interface;
an output interface; and
a power transmission belt engaged with the input interface and output interface to transmit force from the input interface to the output interface,
wherein the input interface and the output interface include a plurality of movable pins engaged with the power transmission belt and the plurality of movable pins is positioned in a plurality of concentric rings around a rotational axis and at least one movable pin is at least partially conical with a tapered contact surface.

20. The pedal drivetrain of claim 19, wherein the input interface has a transmission portion and an actuation portion, and an actuator is configured to actuate at least one movable pin of the plurality of movable pins when the at least one pin is located in the actuation portion.

* * * * *